United States Patent
Sprague et al.

(10) Patent No.: US 9,767,119 B2
(45) Date of Patent: Sep. 19, 2017

(54) SYSTEM AND METHOD FOR MONITORING HOSTS AND STORAGE DEVICES IN A STORAGE SYSTEM

(71) Applicant: NetApp, Inc., Sunnyvale, CA (US)

(72) Inventors: Jason Sprague, Waltham, MA (US);
Ran Gilboa, Waltham, MA (US);
Jeremy Decker, Waltham, MA (US);
Sara Han, Waltham, MA (US);
Michael Johnson, Waltham, MA (US);
Francisco Rosa, Waltham, MA (US);
Yarom Gabay, Waltham, MA (US);
Pengyue Li, Waltham, MA (US)

(73) Assignee: NETAPP, INC., Sunnyvale, CA (US)

( * ) Notice: Subject to any disclaimer, the term of this patent is extended or adjusted under 35 U.S.C. 154(b) by 445 days.

(21) Appl. No.: 14/587,504

(22) Filed: Dec. 31, 2014

(65) Prior Publication Data
US 2016/0188582 A1    Jun. 30, 2016

(51) Int. Cl.
*G06F 17/30* (2006.01)

(52) U.S. Cl.
CPC .................. *G06F 17/302* (2013.01)

(58) Field of Classification Search
None
See application file for complete search history.

(56) References Cited

U.S. PATENT DOCUMENTS

| 6,721,789 B1 | 4/2004 | DeMoney |
| 8,019,965 B2 * | 9/2011 | Agombar ............ G06F 3/0605 711/112 |
| 8,452,856 B1 | 5/2013 | Lent et al. |

(Continued)

FOREIGN PATENT DOCUMENTS

WO    WO 2012/058169    5/2012

OTHER PUBLICATIONS

International Search Report and Written Opinion on co-pending PCT application (PCT/US2014/038730) from International Searching Authority (EPO) dated Aug. 13, 2014.

(Continued)

*Primary Examiner* — Debbie Le
(74) *Attorney, Agent, or Firm* — Klein, O'Neill & Singh, LLP

(57) ABSTRACT

A system and method for monitoring hosts and storage devices in a storage system includes a memory containing machine readable medium comprising machine executable code having stored thereon instructions for performing a method of managing application performance and a processor coupled to the memory. The processor is configured to execute the machine executable code to detect a first datasource for a storage device, determine one or more first storage identifiers associated with the storage device, record the first storage identifiers, detect a second datasource for a compute resource, determine a file system used by the compute resource, determine a second storage identifier associated with the file system, and in response to determining that the second storage identifier matches one of the first storage identifiers, record a first association between the file system and the compute resource and record a second association between the file system and the storage device.

20 Claims, 5 Drawing Sheets

(56) References Cited

U.S. PATENT DOCUMENTS

| | | | |
|---|---|---|---|
| 8,458,138 B1* | 6/2013 | Sirianni | G06F 17/30221 |
| | | | 707/679 |
| 8,812,806 B2 | 8/2014 | Fredricksen et al. | |
| 9,083,724 B2 | 7/2015 | Karnawat et al. | |
| 9,152,642 B2* | 10/2015 | Harrison | G06F 17/30091 |
| 9,569,367 B1* | 2/2017 | Wigmore | G06F 12/0891 |
| 9,639,277 B2* | 5/2017 | Nakajima | G06F 3/061 |
| 2004/0098383 A1 | 5/2004 | Tabellion et al. | |
| 2008/0208926 A1 | 8/2008 | Smoot et al. | |
| 2008/0222375 A1 | 9/2008 | Kotsovinos et al. | |
| 2008/0288948 A1 | 11/2008 | Attarde et al. | |
| 2009/0125962 A1 | 5/2009 | Colosky, Jr. et al. | |
| 2009/0259791 A1 | 10/2009 | Mizuno et al. | |
| 2010/0332401 A1 | 12/2010 | Prahlad et al. | |
| 2011/0022812 A1 | 1/2011 | van der Linden et al. | |
| 2011/0225359 A1 | 9/2011 | Kulkarni et al. | |
| 2011/0231604 A1 | 9/2011 | Taguchi et al. | |
| 2011/0264805 A1* | 10/2011 | Breitgand | G06F 9/45558 |
| | | | 709/226 |
| 2012/0239859 A1 | 9/2012 | Lary et al. | |
| 2012/0317155 A1 | 12/2012 | Ogasawara et al. | |
| 2013/0212345 A1* | 8/2013 | Nakajima | G06F 3/0605 |
| | | | 711/161 |
| 2014/0337061 A1 | 11/2014 | Olson et al. | |
| 2016/0344596 A1 | 11/2016 | Holden et al. | |

OTHER PUBLICATIONS

Notice of Allowance on related U.S. Appl. No. 13/905,920 dated Jun. 1, 2015.

Non-Final Office Action on co-pending U.S. Appl. No. 14/716,548 dated Jan. 30, 2017.

Notice of Allowance on co-pending U.S. Appl. No. 14/716,548 dated Jun. 27, 2014.

* cited by examiner

SYSTEM AND METHOD FOR MONITORING HOSTS AND STORAGE DEVICES IN A STORAGE SYSTEM

TECHNICAL FIELD

The present disclosure relates generally to computing systems, and more particularly to monitoring of hosts and storage devices in a storage system.

BACKGROUND

In a computing environment using distributed storage, such as a storage area network (SAN) or network-attached storage (NAS), storage may be provided to one or more users or applications using a highly abstracted infrastructure. This means that the characteristics and locations of the storage devices, such as disk drives, storage arrays, volumes, and servers, where the actual storage takes place, are typically hidden from the user, such as an application or host, accessing the storage. The user accesses the distributed storage by referencing its symbolic or virtual location, and the distributed storage system automatically translates the virtual location into a physical location where the requested storage is actually stored and forwards the storage request to the physical device at that location. This allows the vendor providing the storage to exercise extensive flexibility in deciding how and where to implement the storage as the distributed storage system may simply change how it translates the virtual location requested by the user or application. This includes the ability to move storage from one storage device to another to address capacity, workload, and/or other requirements. These changes in implementation details are often hidden or transparent from the user, which access the storage devices by making storage requests using an interface, such as an application programming interface (API), and providing the virtual location information for the requested storage. Conversely, the storage devices, which form the storage in the storage system, typically have little or no knowledge of the users using the storage system. The storage devices act on and respond to storage requests made to them by the users without having to know many of the details of the user or host making the storage requests. These virtualized and/or abstracted features of distributed storage systems may make them useful in cloud computing systems.

And while distributed storage provides great flexibility to the storage provider as well as the users, this abstraction or hiding of the details of the storage devices in the storage system from the users, as well as the hiding of the details of the users from the storage devices may complicate some management and/or monitoring tasks. This may be particularly true when a management and/or monitoring task requires knowledge or information about both the storage devices and the users using the storage devices. For example, consider a scenario where a storage provider is providing several storage devices for use by several users. The storage provider may naturally want to chargeback or bill each of the users for their use of the storage devices. The storage provider has access to usage information related to the storage devices through the metadata and management data of the storage devices. This may include knowledge about how the storage devices are divided into volumes, the size allocated for each volume, numbers and types of storage requests, numbers of storage blocks that have been written to, the tiers and services levels for the storage requests, etc. But this information isn't a complete picture of the actual usage of the storage devices. For example, when a file system is no longer using a storage block, such as when a file is deleted, the file system may just free the block and update portions of the metadata of the file system. The storage devices, however, do not know how to interpret this information and thus, the storage devices do not actually know how much of the allocated storage is actually being used or for what purpose the storage is being used. Determining the actual usage of the storage devices involves knowledge of the types of file systems as well as the operating systems and hosts using and maintaining the file systems using the volumes and storage devices. This information is available from the hosts and is not typically known by the storage devices or the storage provider, thus making determination of actual usage problematic. This presents a problem when the chargeback or billing formulas are based on both allocation and actual usage.

Accordingly, it would be desirable to provide improved methods and systems for management of hosts and storage devices in a storage system so that it is possible to detect which hosts and file systems are using which volumes and storage devices and then use the results of the detection to support management and/or monitoring tasks using knowledge associated with both storage devices and the hosts or users using the storage devices.

Figure 1:
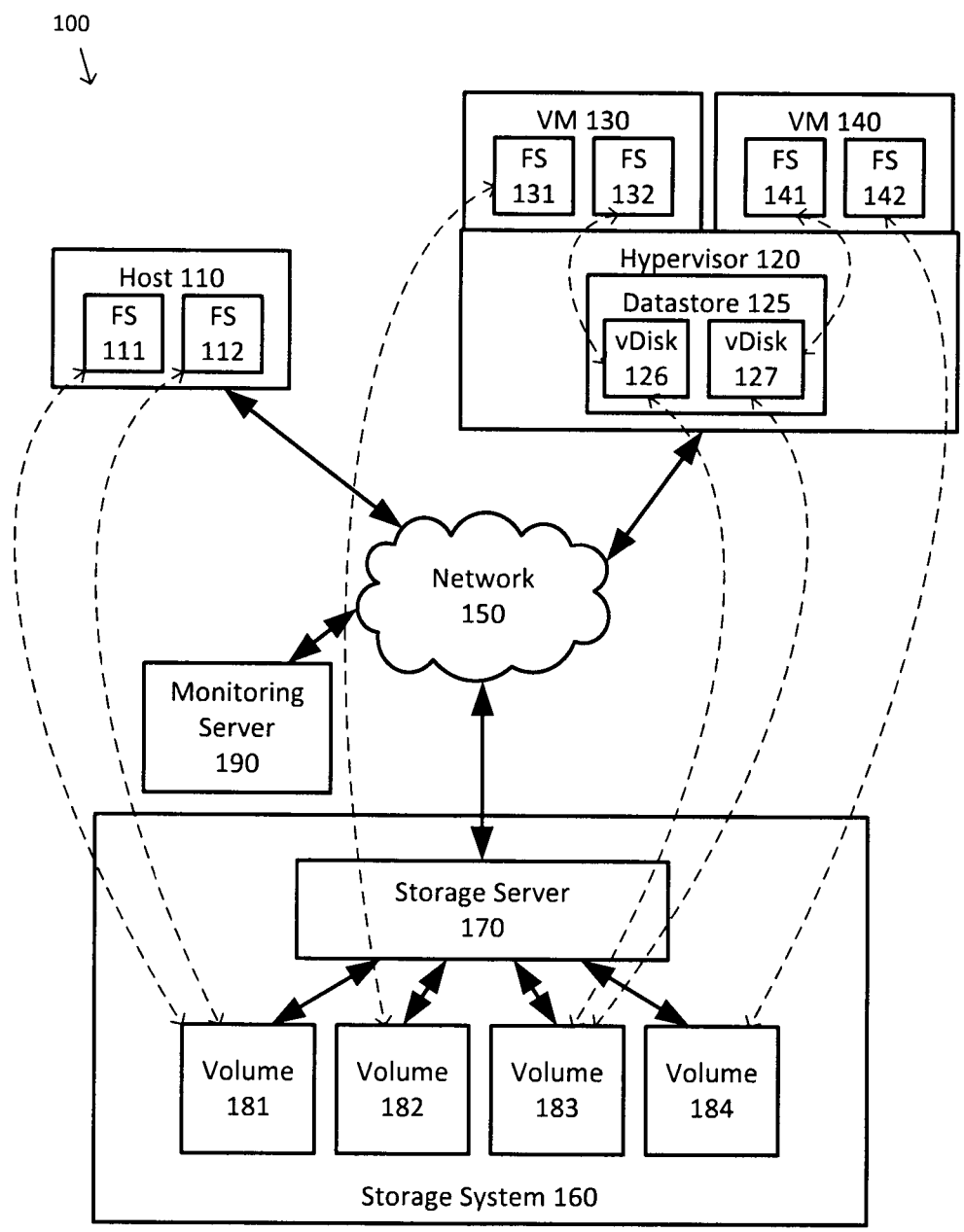
FIG. 1 is a simplified diagram of an example distributed computing system according to some embodiments.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Management and monitoring of storage devices and computing devices using a shared storage system in the computing cloud may present many challenges to the system administrator. This is because there is often a separation between the management and monitoring of the storage devices (such as disk drives) and the computing devices (such as PCs and servers). One reason this may occur is to support interchangeability and interoperability between the storage devices and the computing devices. In this way, one computing device may work with different kinds of storage devices from different vendors. Similarly, many different computing devices with different operating systems may work with the same type of storage device. Another reason this may occur is because the entities operating the storage devices and the computing devices are separate from each other. That is, a storage provider would typically be responsible for providing and managing the storage devices and the storage system while separate users are responsible for managing the computing devices. This provides great flexibility in the cloud computing environment as many computing devices with different operating systems and different locations may then easily use the same storage device. Similarly, each of the computing devices may easily use many different types and kinds of storage devices in different locations.

This interchangeability and interoperability is not without its drawbacks. The separation makes it difficult to share and cross-reference information about the computing devices and the storage devices. For example, the storage system that is providing the storage devices may know lots of information about the storage devices such as their type, how large they are, how much of their storage space is promised to computing devices, numbers of read and write operations, etc., but know very little about the computing devices using the storage devices other than a remote network address to which the results of the read and write operations are being returned. Similarly, the computing system containing the computing devices may know lots of information about the computing devices such as their operating system, file organization system, amount of actual storage used by the file organization system, etc., but know very little information about the storage devices being used to store the data organized by the file organization system because the operating system and file organization system typically specify the storage devices using a storage volume identifier that the storage system uses to determine which storage device or storage devices receive a read or write request.

In many situations, this separation between storage devices and the computing devices has little impact on the management and monitoring of the storage devices and the computing devices as the storage devices may be managed and monitored independently from each other as the computing devices may often operate the storage devices as black boxes into which data may be stored and retrieved. And, as long as the stored data is retrievable without unreasonable delay, this separation works without much impact on the management and monitoring of either the storage devices or the computing devices.

However, in some management and monitoring tasks, detailed information about both the storage devices and the computing devices is used. One example of this is when a storage provider desires to chargeback or bill each of its users for their usage of the storage devices provided by the storage provider. The billing formula may include charges related to how much space is reserved on the storage devices and the level of service provided as well as how much space is actually being used on the storage devices. The level of service may be related to how quickly the storage devices can respond to read and write requests, how many read and write requests the storage devices can handle during a given time period, and the amount of backup or redundancy being provided. The management and monitoring tools of the storage system and the storage provider typically provide ready access to the information that describes the reservation of space and the service level, but not to the information related to the actual storage used by each of the computing devices because that is typically maintained by the computing devices in their operating systems and file organization system and cannot be easily determined by observing the read and write requests being received by the storage devices. One reason for this is how operating systems and file organization systems typically deal with information that no longer has to be accessed. For example, when a file is deleted by an operating system or file organization system, rather than erasing the file, the operating system or file organization system does not actually delete the files, but instead deletes its references to the files and then records that the areas or blocks used by the deleted files may be used for other files. Thus, when a file is deleted, very few read or write requests are typically sent to the storage devices, even when the deleted file is very large and uses many areas or blocks, and consequently, the storage devices often cannot tell the difference between an area or block being used by a file and an area or block that is available for reuse.

One solution to this separation problem includes the use of a combined management and monitoring system that is able to solicit both the reservation and service level information from the storage devices and the usage information from the computing devices. The combined management and monitoring system may use interfaces provided by the storage devices and the computing devices to access the desired information from each. Thus, each storage device includes an interface through which the combined management and monitoring system may request and receive the reservation, service level, and other storage device information, and each computing device includes an interface through which the combined management and monitoring system may request and receive the actual usage and other computing device information.

The storage device and computing device interfaces alone, however, do not generally provide enough information to the combined management and monitoring system to support the chargeback and other similar management and monitoring tasks because it is still useful to know which computing devices and which file organization systems are using each storage device. The computing devices do not know this information because they access the storage devices using storage volume identifiers, which do not directly specify this information, and the storage devices do not know this information because they return the results of read and write requests to the remote network address from which the read and write requests were received. Further complicating this, is that each operating system, file organization system, and storage vendor may use or record different kinds of storage volume identifiers.

Determining which computing devices and file organization systems are using which storage device involves the cooperation of both the interfaces provided by the computing devices and the interfaces provided by the storage devices. One way of determining this information is through a method of discovery and matching that may be used by the combined management and monitoring system.

During a discovery phase, as the combined management and monitoring system discovers the existence of storage devices, which are organized as storage volumes or virtual storage devices called virtual disks, the combined management and monitoring system requests, using the interface of the respective storage volume or virtual disk, a list of identifiers by which the storage volume or virtual disk may be identified. These identifiers may include serial numbers, universally unique identifiers (UUIDs), logical unit numbers, physical device identifier, etc. Each volume or virtual disk may have more than one identifier, which may also identify a feature or capability of the volume or virtual disk. Each of the identifiers is then associated with its respective volume or virtual disk and then stored by the combined management and monitoring system. Then, as the combined management and monitoring system discovers the existence of computing devices in the form of physical or virtual hosts, the combined management and monitoring system, using the interface of the respective physical or virtual host, requests a list of candidate identifiers that may be used by the respective physical or virtual host to access one of storage devices, volumes, or virtual disks. Each physical or virtual host may provide multiple candidate identifiers depending on how many file organization systems it is supporting as well as the various features or capabilities desired for the file organization system or the storage devices, volumes, or virtual disks used to store the data for the file organization system. These candidate identifiers may be determined from operating system registry entries, environment variables, and other locations known by the operating system and file organization system used by each of the physical and virtual hosts. The combined management and monitoring system may then compare each of the candidate identifiers to the stored list of identifiers received from the storage devices, volumes, and virtual disks and when a match is found, the respective physical or virtual host and its corresponding file organization system are associated with each other and the association is recorded.

The stored identifiers and their corresponding associations may then be used to support management and monitoring operations. For example, the chargeback operation may begin by being provided a storage device of interest and then using that information to determine a list of volumes being stored on the storage device. Once this is known, a list of volume and virtual disk identifiers for the storage device are retrieved and this information is used to identify and access the corresponding interface for the volume or virtual disk to determine the reservation, service level, and other storage information. The recorded associations between the volumes and virtual disks and the physical and virtual hosts and file organization systems may be used to identify and access the corresponding interfaces for the associated physical and virtual hosts and file organization systems to determine the actual usage and other computing device information. Once the information is received from the volumes, virtual disks, and hosts, the chargeback formulas may be applied to determine the chargeback values for each of the physical and virtual hosts using the storage device of interest.

FIG. 1 is a simplified diagram of an example distributed computing system 100 according to some embodiments. As shown in FIG. 1, distributed computing system 100 includes an example physical host 110. In some examples, physical host 110 may be representative of a personal computer (PC), laptop, tablet device, mobile device, server, and/or any other computing or compute device. In some examples, physical host 110 may be running an operating system such as a version of Windows® from Microsoft, Inc., a version of Mac OS or iOS from Apple, Inc., a version of Unix or Linux, a version of Android OS, and/or the like. Physical host 110 is storing files and other information using two file systems 111 and 112. For example, when the operating system running on physical host 110 is a version of Windows®, the file systems may correspond to the C: and D: drives, respectively; and when the operating system is Unix or Linux, the file systems may correspond to root and /var, respectively, or some other system mounted by Unix or Linux. Although physical host is shown using two file systems 111 and 112, one of ordinary skill would understand that physical host 110 may use any number of file systems supported by its operating system.

Distributed computing system 100 further includes a device running a hypervisor 120. Hypervisor 120 allows the device to act as a host for one or more virtual hosts or virtual machines. In some examples, hypervisor 120 may be a version of VMware from VMware, Inc., and/or the like. In addition to providing an operating environment for the one or more virtual hosts or virtual machines, hypervisor 120 may also provide a datastore 125 for use by the virtual hosts or virtual machines. Datastore 125 is shown providing the storage in the form of two virtual disks or vdisks 126 and 127, although one of ordinary skill would understand that datastore 125 may provide any number of virtual disks. Representative of the one or more virtual hosts or virtual machines are virtual machine 130 using file systems 131 and 132 and virtual machine 140 using file systems 141 and 142. Like physical host 110, virtual machines 130 and 140 may be running any of various operating systems, and the operating systems running on virtual machines 130 and 140 may be the same or different. Although virtual machines 130 and 140 are each shown using two file systems 131 and 132 and 141 and 142, respectively, one of ordinary skill would understand that virtual machines 130 and 140 may use any number of file systems supported by their respective operating systems.

Physical host 110 and virtual machines 130 and 140 (through hypervisor 120) may be coupled to a network 150 in order to access a distributed storage system 160. Network 150 may include one or more network switching devices, such as routers, switches, hubs, and/or bridges, which forward storage requests made by the operating systems and file systems 111, 112, 131, 132, 141, and/or 142 of physical host 110 and/or virtual machines 130, 140 to storage system 160 and then forward responses to the storage requests back to the respective host or virtual machine. In practice, network 150 may be any kind of network including a local area network (LAN), such as an Ethernet, or a wide area network (WAN), such as the Internet. In some examples, storage system 160 may be a clustered data ONTAP® storage system provided by NetApp, Inc.

Storage system 160 may include one or more storage servers, such as representative storage server 170, and one or more storage volumes, such as representative volumes 181-184. Each of the volumes 181-184 may be identified by one or more volume identifiers, such as a logical unit number (LUN), a serial number, a universal identifier (UID), a universally unique identifier (UUID), a physical device ID, and/or the like. The storage requests from physical host 110 and/or virtual machines 130 and/or 140 may include a corresponding volume identifier as well as a virtual address, such as a block number. The volume identifier and virtual address are then used by storage server 170 to determine which of the one or more volumes 184-184 is associated with the information or data requested in each of the storage requests. In some examples, each of the volumes 181-184 store data for the file systems 111, 112, 131, 132, 141, and 142 using blocks or extents. In some examples, each of the volumes 181-184 may be organized as iSCSI, NFS, and/or other storage volumes.

In some examples, storage server 170 may be coupled to physical storage devices or storage units providing the storage for volumes 181-184 using respective cables or a network. In some examples, one or more of the physical storage devices or storage units may be tightly coupled to storage server 170 using respective cables, such as small computer system interface (SCSI) cables, universal serial bus (USB) cables, peripheral component interconnect (PCI, PCI-X, PCIe) cables, FireWire (IEEE 1394) cables, and/or the like. In some examples, one or more of the storage devices or storage units may be more indirectly coupled to storage server 170 using one or more routers, switches, hubs, bridges, and/or the like. In some examples, the physical storage devices or storage units providing the storage for volumes 181-184 may be implemented by one or more disk drives, flash storage devices, RAID arrays, and/or the like.

Distributed computing system 100 also includes a monitoring server 190 coupled to physical host 110, virtual machines 130 and 140, and storage system 160 using network 150 and/or some other interconnection mechanism. Monitoring server 190 may include one or more management and monitoring applications that request and receive status and other information from physical host 110, virtual machines 130 and 140, and storage system 160 for use by one or more users and/or operators to determine how well distributed computing system 100 is operating, change operating policies for distributed computing system 100, and/or the like.

FIG. 1 further includes dashed lines showing the arrangements and associations between the file systems 111, 112, 131, 132, 141, and 142, the virtual disks 126 and 127, and volumes 181-184. File system 111 is stored on volume 181, so that storage requests made by host 110 for file system 111 may be forwarded through network 150 and storage server 170 to the storage devices associated with volume 181. Similarly, file system 112 is stored on volume 182 giving an example of a particular volume 181 being used for multiple file systems 111 and 112. Similarly, file system 131 is being stored on volume 182 and file system 142 is being stored on volume 184. In contrast, file system 132 and file system 141 are being stored using virtual disks 126 and 127, respectively, provided by datastore 125. However, like other storage, virtual disks 126 and 127 may be stored using physical devices, and in the case of FIG. 1, virtual disks 127 and 127 are implemented using storage on volume 183. In practice, the assignment of file systems to volumes is typically very flexible as file systems may be moved between volumes, file systems from different hosts or virtual machines may be stored in the same volume (such as a shared volume), file systems using virtual disks and those not using virtual disks may be stored on the same volume, and/or the like.

The scope of embodiments of distributed computing system 100 is not limited to the arrangement of structures and elements as shown in FIG. 1. According to certain embodiments one or more of the storage server 170 and/or monitoring server 190 may be optional and/or combined with other devices. In some examples, monitoring server 190 and storage server 170 may be implemented on the same server. In some examples, monitoring server 190 and storage server 170 may be implemented on the same or separate virtual machines on the same server. In some examples, storage server 170 and/or monitoring server 190 may be operated on physical host 110 or on the device running hypervisor 120.

Figure 2:
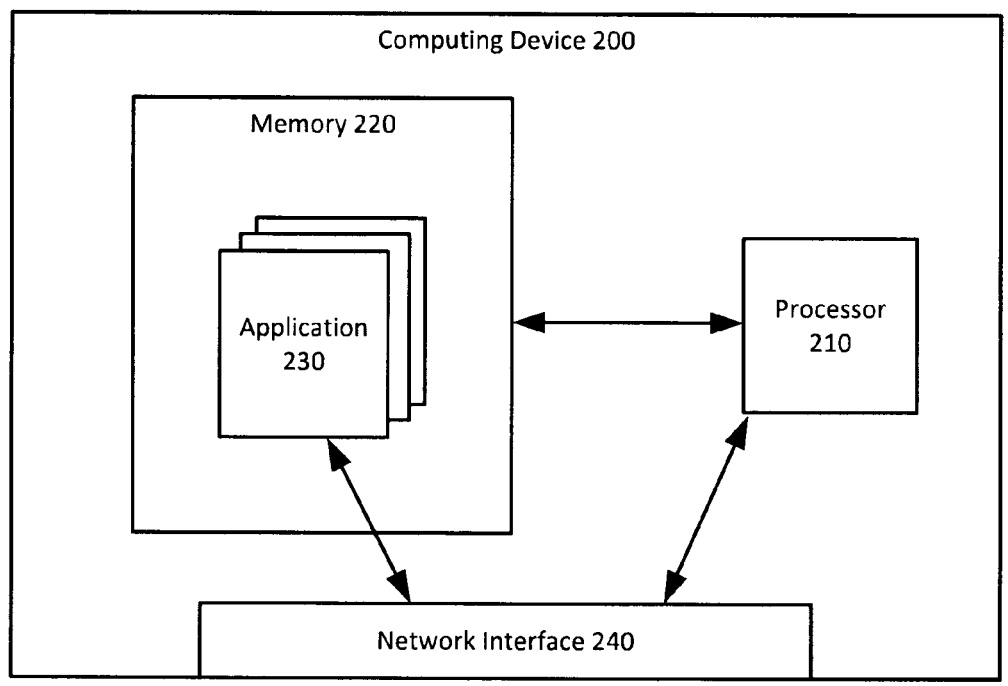
FIG. 2 is a simplified diagram of an example computing device according to some embodiments.

FIG. 2 is a simplified diagram of an example computing device 200 according to some embodiments. According to some embodiments, computing device 200 may be representative of any of the computing devices in distributed computing system 100, include physical host 110, the device running hypervisor 120, virtual machine 130, virtual machine 140, storage server 170, the storage devices used by volumes 181-184, and/or monitoring server 190. Computing device 200 may be any kind of computer system including a standalone workstation, a cluster, a production server, within a virtual machine, and/or the like. As shown in FIG. 2, computing device 200 includes a processor 210 coupled to memory 220. In some examples, processor 210 may control operation and/or execution of hardware and/or software on computing device 200. Although only one processor 210 is shown, computing device 200 may include multiple processors, multi-core processors, microprocessors, digital signal processors (DSPs), application specific integrated circuits (ASICs), field programmable gate arrays (FPGAs), and/or the like. Memory 220 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 220 may be used to store several software packages and systems that are executed by processor 210. These software packages and systems are depicted in FIG. 2 as one or more applications 230. The applications 230 may include user applications, service applications, maintenance applications, operating systems, operating system services, file system drivers, storage application programming interfaces (APIs), hypervisors, virtual operating systems, datastores, and/or the like. As each of the applications 230 make storage requests, they are typically made through the operating system and using the file system drivers or storage APIs that know to route the storage requests either to a storage device, such as a local disk drive or memory and/or through a network to a storage server, such as storage server 170. In some examples, the operating system, file system drivers, and/or storage APIs may typically include an interface that abstracts the details regarding the location and the devices that implement the storage. Depending upon the role of computing device 200 in a distributed computing system, the number and type of applications 230 may vary.

For example, when computing device 200 is used as physical host 110, the applications 230 may include an operating system, file system drivers for file systems 111 and 112, one or storage APIs, as well as applications reading and writing data to file systems 111 and 112. When computing device 200 is used as the device running hypervisor 120, the applications 230 may include hypervisor 120, storage APIs for implementing datastore 120 and virtual disks 126 and 127, virtual operating systems for virtual machines 130 and 140, file system drivers for file systems 131, 132, 141, and 142, as well as applications reading and writing data to file systems 131, 132, 141, and 142. When computing device 200 is used as storage server 170, applications 230 may include an operating system as well as APIs for receiving and forwarding storage requests to volumes 181-184. When computing device 200 is used as one of the storage devices used to store data for volumes 181-184, applications 230 may include an operating system and storage APIs. When computing device 200 is used as monitoring server 190, applications 230 may include an operating system, management and monitoring applications for collecting and processing information received from other computing devices in distributed computing system 100, and one or more APIs or user interfaces to allow locally and/or remotely connected users and/or operators to access the collected information and to send configuration commands to the other computing devices.

The one or more applications 230 may further include an API and/or similar interface, sometimes called a datasource, which may be used to allow a management and monitoring application, such as a management and monitoring application of monitoring server 190, to access and/or change configuration, usage data, metadata, and/or the like associated with computing device 200. In some examples, the datasource may be configured to receive one or more messages from the management and monitoring application, access the requested data or information, and return the request data or information to the requestor using one or more response messages. In some examples, the one or more messages may also include configuration and/or changes in configuration for the operation of computing device 200. In some examples, the datasource may be implemented to respond to API calls, remote procedure calls (RPCs), web service calls, and/or the like. Using the datasource associated with storage system 160 may provide information about storage system 160 such as its operating system type and version used by storage server 170, the number and identifiers for volumes 181-184, logged usage details, and/or the like. Similarly, using the datasource associated with physical host 110 may provide information about physical host 110 including its operating system, file systems 111 and 112, usage details for file systems 111 and 112, and/or the like.

Computing device 200 may further include a network interface 240. Network interface 240 may be used to couple computing device 200 to one or more networks, such as network 150, via one or more network links so that storage requests and other information may be transmitted to and from computing device 200 over the networks. Network interface 240 may include one or more circuits that may be used to buffer incoming and outgoing message, generate and interpret network signals, and/or the like. In some examples, the one or more circuits may include one or more modems, codecs, line drivers, wireless antennas, and/or the like so that computing device 200 may be coupled to wireless networks, Ethernets, asynchronous transfer mode (ATM) networks, and/or the like. Network interface 240 is also coupled to processor 210 and may be subject to monitoring and/or control by processor 210 and/or one or more of applications 230.

Referring back to FIG. 1 and the role of monitoring server 190, the role and operation of the management and monitoring application of monitoring server 190 is now described in further detail. Among its many responsibilities, the management and monitoring application may perform discovery on the distributed computing system 100 to discover the various devices and/or datasources in the distributed computing system 100, data collection from the datasources, and/or reporting. During the discovery phase, the management and monitoring application may discover each of the datasources in computing system 100, but also the relationships between the datasources and the devices they represent. In some examples, the relationships may be helpful for certain reporting tasks where multiple devices are aggregated together in some fashion, when information from interrelated datasources is used to generate a report, and/or the like. In some examples, it may be helpful to know the relationships between the storage devices and the volumes the storage devices are storing data for, the volumes used for a virtual disk, and the relationships between physical hosts, virtual machines, virtual disks, and volumes so that the associations represented by the dashed lines in FIG. 1 are known to the management and monitoring application.

Figure 3:
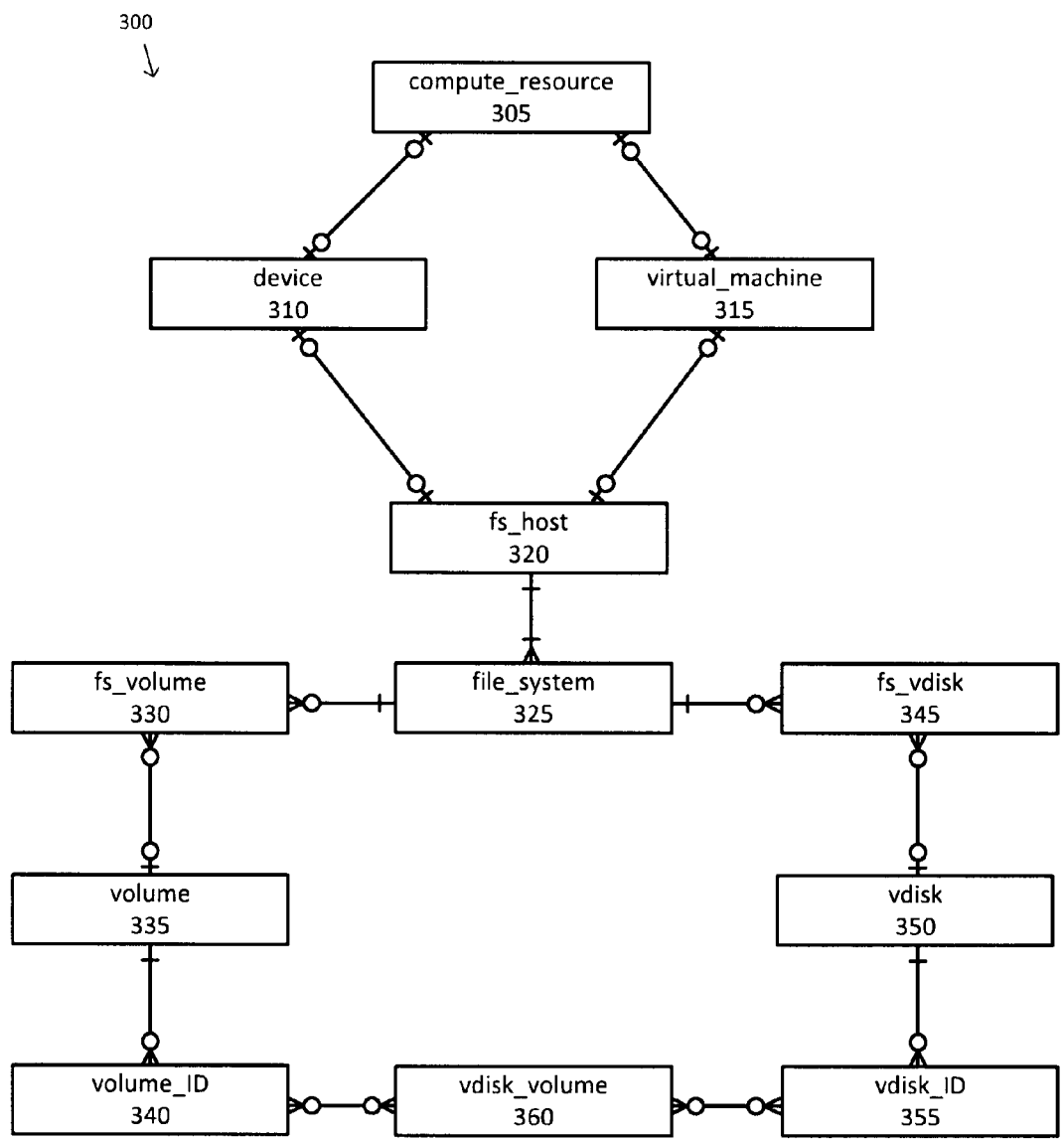
FIG. 3 is a simplified diagram of an example entity relationship for a distributed computing system according to some embodiments.

FIG. 3 is a simplified diagram of an example entity relationship 300 for a distributed computing system according to some embodiments. In some embodiments, entity relationship 300 may be used to describe the types and numbers of the associations found in a distributed computing system, such as distributed computing system 100. In some embodiments, entity relationship 300 may be used to describe the organization and structure of one or more data structures or one or more database tables that may be used to record the associations found in the distributed computing system as would be understood by one of ordinary skill in the art. The entity relationship 300 of FIG. 3 uses a notation system where each entity is represented by a rectangular box and relationships between the entities are shown using links between the rectangular boxes. The symbol or symbols at the end of each link provide information regarding the cardinality or number of the interrelationships. For example, a straight end or a straight end with a cross hatch indicate one of the entities at that end of the link. A straight end with a circle indicate 0 or 1 entity, a split or crows foot end indicate 1 or more entities, and a crows foot end with a circle indicate 0 or more entities. Thus, by mixing and matching different ends, various forms of optional, one-to-one, one-to-many, and many-to-many interrelationships may be depicted. In some examples, when entity relationship 300 is implemented as a data structure or database, the links between entities may be recorded using references or pointers between instances of the entities and/or using foreign key attributes or fields of the entities.

As shown in FIG. 3, entity relationship 300 includes a compute_resource 305. Instances of the compute_resource 305 may correspond to any computing resource and/or computing device that is using storage in the distributed storage system. This may include physical host 110 and/or virtual machines 130 and 140. Instances of entities represented by compute_resource 305 may have attributes that identify an operating system used by the compute_resource, an interne protocol (IP) address, a unique identifier for the instance, a uniform resource locator (URL) or other identifier for a datasource provided by the instance, and/or the like. Closely related to the compute_resource 305 are a device 310 and/or a virtual_machine 315. Depending on whether the instance of the compute_resource 305 is a physical host, such as physical host 110, or a virtual machine, such as virtual machine 130 and/or 140, each instance of device 310 or virtual machine 315 indicates whether the associated instance of compute_resource 305. As indicated by the links between compute_resource 305 and device 310 and virtual_machine 315, each instance of compute_resource 305 is classified as either an instance of device 310 or virtual_machine 315. A data structure or database capturing the elements and relationships of distributed computing system 100 of FIG. 1, would have three instances of compute_resource 305 corresponding to physical host 110 and virtual machines 130 and 140, respectively. One instance of device 310 for physical host 110 would be linked to the corresponding compute_resource 305 instance for physical host 110. Similarly, there would be two correspondingly linked instances of virtual_machine 315 corresponding to virtual machines 130 and 140.

Each instance of compute_resource 305 and the corresponding instance of device 310 or virtual_machine 315 may be maintaining zero or more file systems. This is captured in entity relationship 300 using an associative entity fs_host 320 and a file_system 325. The links indicate that each instance of device 310 and virtual_machine 315 may be associated with multiple instances of file_system 325. Each instance of fs_host 320 may include references, pointers, or foreign keys to relate a corresponding instance of device 310 or virtual_machine 315 with an associated instance of file_system 325. Instances of entities represented by file_system 325 may include attributes for file system type, a unique identifier, a URL or identifier, and/or the like. Using the examples, of FIG. 1, there would be six instances of fs_host 320 and file_system 325, with each pair corresponding to one of the file systems 111, 112, 131, 132, 141, and 142.

Because each file system may be stored using one or more volumes or one or more virtual disks, each instance of file_system 325 is linked via a many-to-many relationship using an associative entity fs_volume 330 to a volume 335 or via a many-to-many relationship using an associative entity fs_vdisk 345 to a vdisk 350. These links and the corresponding references, pointers, or foreign keys in fs_volume 330 and/or fs_vdisk 345 associating instances of file_system 325 and volume 335 and/or vdisk 350 help record the possibilities that a file system may be stored using one or more volumes or one or more virtual disks. Similarly, the associations also record that a volume or virtual disk may be used to store one or more file systems. Each instance of volume 335 and vdisk 350 may include attributes for recording volume information such as type, unique identifier, a URL or identifier for the datasource provided by the instance, and/or the like. Using the examples of FIG. 1, there would be three instances of volume 335 associated through four instances of fs_volume 330 to the instances corresponding of file_system 325 for file systems 111, 112, 131, and 142. Volume 181 would be associated with file systems 111 and 112, volume 182 would be associated with file system 131, and file system 184 would be associated with file system 142. An instance of volume 335 corresponding to volume 183 would also be present as is described in more detail below. Additionally, there would two instances of vdisk 350 corresponding to virtual disks 126 and 127 associated with the instances of file_system 325 corresponding to file systems 132 and 141, respectively.

In order to support cross-referencing of hosts and file systems with volumes and virtual disks, entity relationship 300 further includes volume_ID 340 and vdisk_ID 355 to record the zero or more identifiers that may be used by the distributed storage system to refer to a volume or virtual disk. The zero to many relationships between volume 335 and volume_ID 340 and vdisk 350 and vdisk_ID 355 capture this possibility. Each instance of volume_ID 340 and vdisk_ID 355 may include an attribute for recording an identifier for the associated instance of volume 335 and/or vdisk 350 as a numerical or string value. Possible values for the identifier may include a LUN, a serial number, a UID, a UUID, a physical device ID, a URL, and/or the like.

Because each virtual disk may also be stored using one or more volumes or a volume may store one or more virtual disks, entity relationship 300 includes a many-to-many associative entity vdisk_volume 360 to record these relationships. Using the examples of FIG. 1, there would be two instances of vdisk_volume 360, one each for associating an identifier for the instance of volume 335 corresponding to volume 183 with an identifier for the instance of vdisk 350 corresponding to virtual disks 126 and 127, respectively.

Although not shown in FIG. 3, entity relationship 300 may include additional entities and their relationships. In some examples, a storage_unit entity in conjunction with a unit_volume associative entity may be used to model and/or record the many-to-many relationships that may exists between volumes and the storage units used to store data for the volumes. In some examples. The storage_unit entity may additionally record metadata and/or other information about the storage unit, including an identifier, a type of physical storage used to implement the storage unit. In some examples, when the storage unit uses multiple storage devices, such as multiple disk drives in a RAID array, instances of an additional drive entity may be used to model and/or record these additional relationships.

Figure 4:
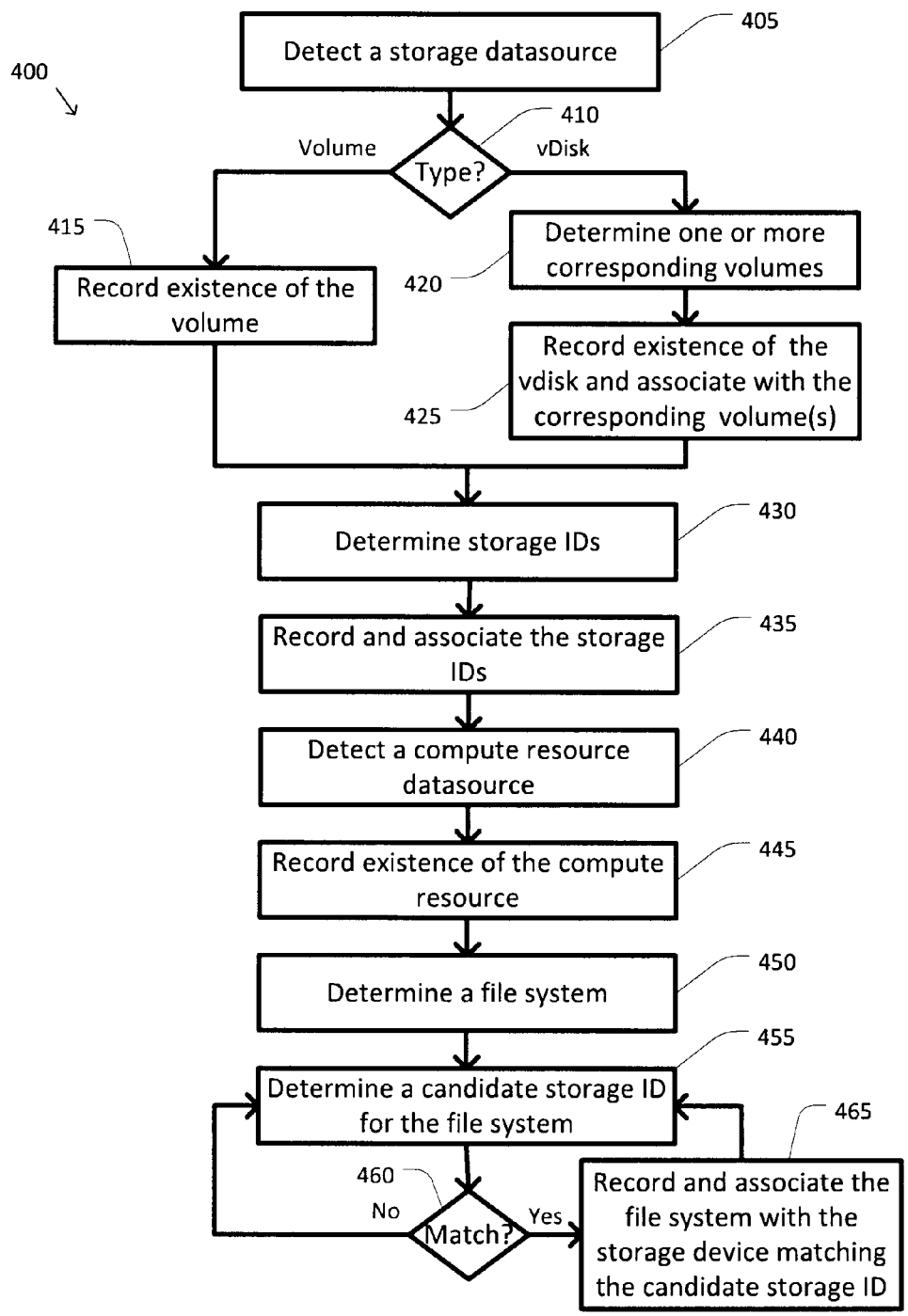
FIG. 4 is a simplified diagram of an example method of relationship discovery in a distributed computing system according to some embodiments.

FIG. 4 is a simplified diagram of an example method 400 of relationship discovery in a distributed computing system according to some embodiments. One or more of the processes 405-465 of method 400 may be implemented, at least in part, in the form of executable code stored on non-transient, tangible, machine readable media that when run by one or more processors (e.g., the one or more processors 210) may cause the one or more processors to perform one or more of the processes 405-465. For example, method 400 may be implemented by one or more of the management and monitoring applications 230 of monitoring server 190. In some examples, method 400 may correspond to a portion of the discovery phase of the one or more of the management and monitoring applications 230. In some examples, method 400 may be used to create and associate instances of the various entities of entity relationship 300. In some examples, the relationships discovered by method 400 may be used to support other management and monitoring applications 230.

At a process 405, a storage datasource is detected. Using one or more discovery mechanisms, a management and monitoring application may exchange one or more messages with other computing devices within a distributed computing system or a distributed storage system. In some examples, the other computing devices may be similar to computing device 200, the distributed computing system may be distributed computing system 100, and the distributed storage system may be storage system 160. In some examples, the one or more messages may correspond to the management and monitoring application sending and/or broadcasting polling messages to other devices in its network neighborhood requesting that any storage devices respond. When the storage devices receive the polling messages, each may respond indicating that they are a storage device and provide a URL or other identifying information so that the management and monitoring application may access the storage datasource of the storage device. In some examples, the one or more messages may correspond to logon and/or registration messages sent from the storage devices so that they become registered with the management and monitoring application. The logon and/or registration messages may provide a URL or other identifying information so that the management and monitoring application may access the storage datasource of the storage device. In some examples, the one or more messages may include one or more messages from other datasources that identify that the storage device is part of the distributed computing system. In some examples, the other datasources may correspond to datasources provided by storage servers, such as storage server 170, and/or hypervisors, such as hypervisor 120. In some examples, the storage device may correspond to any of the volumes 181-184 and/or the virtual disks 126 and/or 127.

At a process 410, a type of the storage datasource is determined. Using one or more API calls, RPCs, web services, and/or the like of the storage datasource detected during process 405, a type of the storage device associated with the storage datasource is determined. In some examples, the storage datasource may be determined to be volume and/or a virtual disk. In some examples, when the storage datasource is associated with a volume, the existence of the volume is recorded using a process 415. In some examples, when the storage datasource is associated with a virtual disk, the existence of the virtual disk is recorded beginning with a process 420.

At the process 415, the existence of the volume is recorded. Using a data structure and/or a database, the existence of the volume associated with the storage datasource detected during process 405 is recorded. In some examples, metadata and/or other information associated with the volume may be recorded. In some examples, the metadata and/or other information may include a URL and/or other identifier for the storage datasource detected during process 405. In some examples, the metadata and/or other information may be determined using one or more queries to the storage datasource associated with the volume. In some examples, when the data structure and/or database is consistent with the entity relationship 300, an instance of volume 335 is created using the metadata and/or other information and stored in the data structure and/or database. After the existence of the volume is recorded, storage identifiers for the volume are determined and recorded beginning with a process 430.

At the process 420, one or more volumes corresponding to the virtual disk are determined. In some examples, the management and monitoring application may query the storage datasource associated with the virtual disk to determine the identifiers and/or other information associated with the one or more volumes that are storing data associated with the virtual disk. In some examples, each of the one or more volumes may correspond to a volume previously discovered using processes 405-415, 430, and/or 435. In some examples, discovery of a previously unrecorded volume during process 420, may result in performing processes 405-415, 430, and/or 435 for the previously unrecorded volume before process 420 may be completed.

At a process 425, the existence of the virtual disk is recorded and the virtual disk is associated with the corresponding one or more volumes. Using a data structure and/or a database, the existence of the virtual disk associated with the storage datasource detected during process 405 is recorded. In some examples, metadata and/or other information associated with the virtual disk may be recorded. In some examples, the metadata and/or other information may include a URL and/or other identifier for the storage datasource detected during process 405. In some examples, the metadata and/or other information may be determined using one or more queries to the storage datasource associated with the virtual disk. In addition to recording the existence of the virtual disk, the associations with the corresponding one or more volumes is also noted for further processing as discussed in further detail below. In some examples, when the data structure and/or database is consistent with the entity relationship 300, an instance of vdisk 350 is created using the metadata and/or other information and stored in the data structure and/or database. After the existence of the virtual disk is recorded, storage identifiers for the virtual disk are determined and recorded beginning with the process 430.

At the process 430, one or more storage identifiers are determined. To support the later cross-referencing and/or association with hosts and/or file systems, each of the one or more storage identifiers that may be used to identify the volume and/or virtual disk associated with the storage datasource detected during process 405 are determined. In some examples, the one or more storage identifiers may be determined using one or more queries to the storage datasource associated with the volume and/or virtual disk. In some examples, a specialized API call, RPC, and/or web service of the storage datasource may be used to receive the one or more storage identifiers. In some examples, the one or more storage identifiers may be returned in a list, an array, a result set, and/or other iterable data structure. In some examples, the storage identifiers may include a LUN, a serial number, a UID, a UUID, a physical device ID, a URL, and/or the like. In some examples, the one or more storage identifiers may include storage identifiers corresponding to specific use cases of the volume and/or virtual disk. In some examples, the storage identifiers for each use case may be a modified version of the LUN, the serial number, the UID, the UUID, and/or the physical device ID so that variations for each supported use case may be included. For example, one possible use case is chargeback.

At a process 435, the one or more storage identifiers are recorded and associated with the volume and/or virtual disk. Existence of each of the storage identifiers received during process 430 is recorded and associated with the volume and/or virtual disk as appropriate in a data structure and/or database. In some examples, the storage identifiers may be recorded and associated differently depending on whether the storage datasource is associated with a volume or a virtual disk. When the storage datasource is associated with a volume and the data structure and/or database is consistent with the entity relationship 300, an instance of volume_ID 340 is created for each of the one or more storage identifiers. Each instance of volume_ID 340 is then associated with the instance of volume 335 created during process 415. When the storage datasource is associated with a virtual disk and the data structure and/or database is consistent with the entity relationship 300, an instance of vdisk_ID 355 is created for each of the one or more storage identifiers. Each instance of vdisk_ID 355 is then associated with the instance of vdisk 350 created during process 425. In some examples, each of the virtual disk to volume associations determine during processes 420 and/or 425 are recorded as associations between corresponding instances of vdisk_ID 355 and corresponding instances of volume_ID 340 using instances of vdisk_volume 360. In this way, a record is made of the volumes being used to store data for the virtual disk.

Although FIG. 4 depicts processes 405-435 being applied to a single storage datasource, one of ordinary skill would understand that processes 405-435 may be applied to as many storage datasources as are detected by the management and monitoring application. In the examples, of FIG. 1, processes 405-435 may be applied for each of the storage datasources associated with volumes 181-184 and/or virtual disks 126 and/or 127.

At a process 440, a compute resource datasource is detected. Using one or more discovery mechanisms, a management and monitoring application may exchange one or more messages with other computing devices within the distributed computing system. In some examples, the other computing devices may be similar to computing device 200 and the distributed computing system may be distributed computing system 100. In some examples, the one or more messages may correspond to the management and monitoring application sending and/or broadcasting polling messages to other devices in its network neighborhood requesting that any compute resources respond. When the compute resources receive the polling messages, each may respond indicating that they are a compute resource and provide a URL or other identifying information so that the management and monitoring application may access the compute resource or host datasource of the compute resource. In some examples, the one or more messages may correspond to logon and/or registration messages sent from the compute resources so that they become registered with the management and monitoring application. The logon and/or registration messages may provide a URL or other identifying information so that the management and monitoring application may access the compute resource datasource of the compute resource. In some examples, the one or more messages may include one or more messages from other datasources that identify that the compute resource is part of the distributed computing system. In some examples, the other datasources may correspond to datasources provided by hypervisors, such as hypervisor 120. In some examples, the compute resource may correspond to any of physical host 110 and/or virtual machines 130 and/or 140.

At the process 445, the existence of the compute resource is recorded. Using a data structure and/or a database, the existence of the compute resource associated with the compute resource datasource detected during process 440 is recorded. In some examples, metadata and/or other information associated with the compute resource may be recorded. In some examples, the metadata and/or other information may include a URL and/or other identifier for the compute resource datasource detected during process 440. In some examples, the metadata and/or other information may include a type and/or version of an operating system being used on the compute resource. In some examples, the metadata and/or other information may be determined using one or more queries to the compute resource datasource associated with the compute resource. In some examples, when the data structure and/or database is consistent with the entity relationship 300, an instance of compute_resource 305 is created using the metadata and/or other information and stored in the data structure and/or database.

Once the existence of the compute resource is recorded, the type of the compute resource is determined. In some examples, one or more API calls, RPCs, web services, and/or the like of the compute resource datasource detected during process 440 may be used to determine a type of the compute resource associated with the compute resource datasource is determined. In some examples, the compute resource datasource may be determined to be a physical host and/or a virtual machine. In some examples, when the compute resource datasource is associated with a physical host and the data structure and/or database is consistent with the entity relationship 300, an instance of device 310 is created and associated with the instance of compute_resource 305 previously created. In some examples, when the compute resource datasource is associated with a virtual machine and the data structure and/or database is consistent with the entity relationship 300, an instance of virtual_machine 315 is created and associated with the instance of compute_resource 305 previously created.

At a process 450, a file system is determined. In some examples, the management and monitoring application may query the compute resource datasource associated with the virtual disk to determine a file system being used by the compute resource. In some examples, the compute resource datasource may provide metadata and/or other information associated with the file system. In some examples, the metadata and/or other information may include one or more file paths, such as a root file path that may be associated with the file system.

At a process 455, a candidate storage identifiers for the file system is determined. In some examples, one or more API calls, RPCs, web services, and/or the like of the compute resource datasource detected during process 440 may be used to determine the storage identifiers. The compute resource datasource may provide one or more candidate storage identifiers depending on the type and/or version of the file system, a type of an operating system being used on the compute resource, and/or other relevant characteristics of the compute resource. In some examples, each of the candidate storage identifiers may correspond to one or more guesses that the compute resource may make as to the storage device (volume and/or virtual disk) being used to store data for the file system. In some examples, the candidate storage identifiers may include guesses as to the LUN, the serial number, the UID, the UUID, and/or the physical device ID of the corresponding storage device. In some examples, the one or more candidate storage identifiers may include candidate storage identifiers corresponding to specific use cases of the file system that may be supported by the storage device. In some examples, the candidate storage identifiers for each use case may be a modified version of the candidate LUN, serial number, UID, UUID, and/or physical device ID so that variations for each use case supported by the file system are included. For example, one possible use case is chargeback, where the compute resource and the file system are able to provide at least actual usage information to the management and monitoring application. Each of the candidate storage identifiers is then iteratively considered.

At a process 460, it is determined whether a current candidate storage identifier being considered matches a previously recorded storage identifier. The current candidate storage identifier may be iteratively compared against each of the storage identifiers recorded during process 435. In some examples, the comparison may be performed using a numeric comparison, a text comparator, and/or a custom comparator depending on how the storage identifiers are stored. In some examples, a string comparison may be performed on a serialized version of the current candidate storage identifier and the recorded storage identifiers. When the data structure or database used to record the storage identifiers during process 435 is consistent with the entity relationship 300, the current candidate storage identifier may be compared to each of the instances of volume_ID 340 and/or vdisk_ID 355. When the current candidate storage identifier is not matched to any of the recorded storage identifiers, the next candidate storage identifier to consider is determined using process 455. When the current candidate storage identifier matches one of the recorded storage identifiers, the file system is recorded and associated with the storage device associated with the matching storage identifier using a process 465. In some examples, it is possible none of the candidate storage identifiers for the file system match any of the recorded storage identifiers, such as when the file system is associated with a local storage device that is not part of a distributed storage system and/or does not have an associated storage datasource.

At the process 465, the file system is recorded and associated with the storage device matching the current candidate storage identifier. When the current candidate storage identifier matches one of the recorded storage identifiers, the storage device (volume and/or virtual disk) being used to store data for the file system determined during process 450 is determined by the management and monitoring application. The file system is then recorded in a data structure and/or database and the association between the file system and the compute resource detected during process 440 is recorded as well. In some examples, metadata and/or other information associated with the file system may also be recorded. In some examples, the metadata and/or other information may be determined using one or more queries of the datasource associated with the compute resource. In some examples, the metadata and/or other information may include a type and/or version of the file system. The file system is then associated with the storage device corresponding to the matched candidate storage identifier. When the data structure and/or database is consistent with entity relationship 300, the file system is recorded as an instance of file_system 325. The instance of file_system 325 is then associated with the instance of device 310 and/or the instance of virtual_machine 315 recorded during process 445 using an instance of fs_host 320. When the current candidate storage identifier matches an instance of volume_ID 340, the instance of file_system 325 is then associated, using an instance of fs_volume 330, with the instance of volume 335 associated with the matching instance of volume_ID 340. When the current candidate storage identifier matches an instance of vdisk_ID 355, the instance of file_system 325 is then associated, using an instance of fs_vdisk 345, with the instance of vdisk 350 associated with the matching instance of vdisk_ID 355.

Additional candidate storage identifiers may then be considered by returning to process 455 to select the next candidate storage identifier to consider.

Although FIG. 4 depicts processes 450-465 being applied to a single file system, one of ordinary skill would understand that processes 450-465 may be applied to as many file systems as are being used by the compute resource. In the examples, of FIG. 1, processes 450-465 may be applied twice for physical host 110 (once each for file systems 111 and 112), twice for virtual machine 130 (once each for file systems 131 and 132), and twice for virtual machine 140 (once each for file systems 141 and 142). In some examples, the one or more queries of process 450 may return in a list, an array, a result set, and/or other iteratable data structure that may be used to repeatedly apply processes 450-465.

Although FIG. 4 depicts processes 440-465 being applied to a single compute resource datasource, one of ordinary skill would understand that processes 440-465 may be applied to as many compute resource datasources as are detected by the management and monitoring application. In the examples, of FIG. 1, processes 440-465 may be applied for each of the compute resource datasources associated with physical host 110 and/or virtual machines 130 and/or 140.

Figure 5:
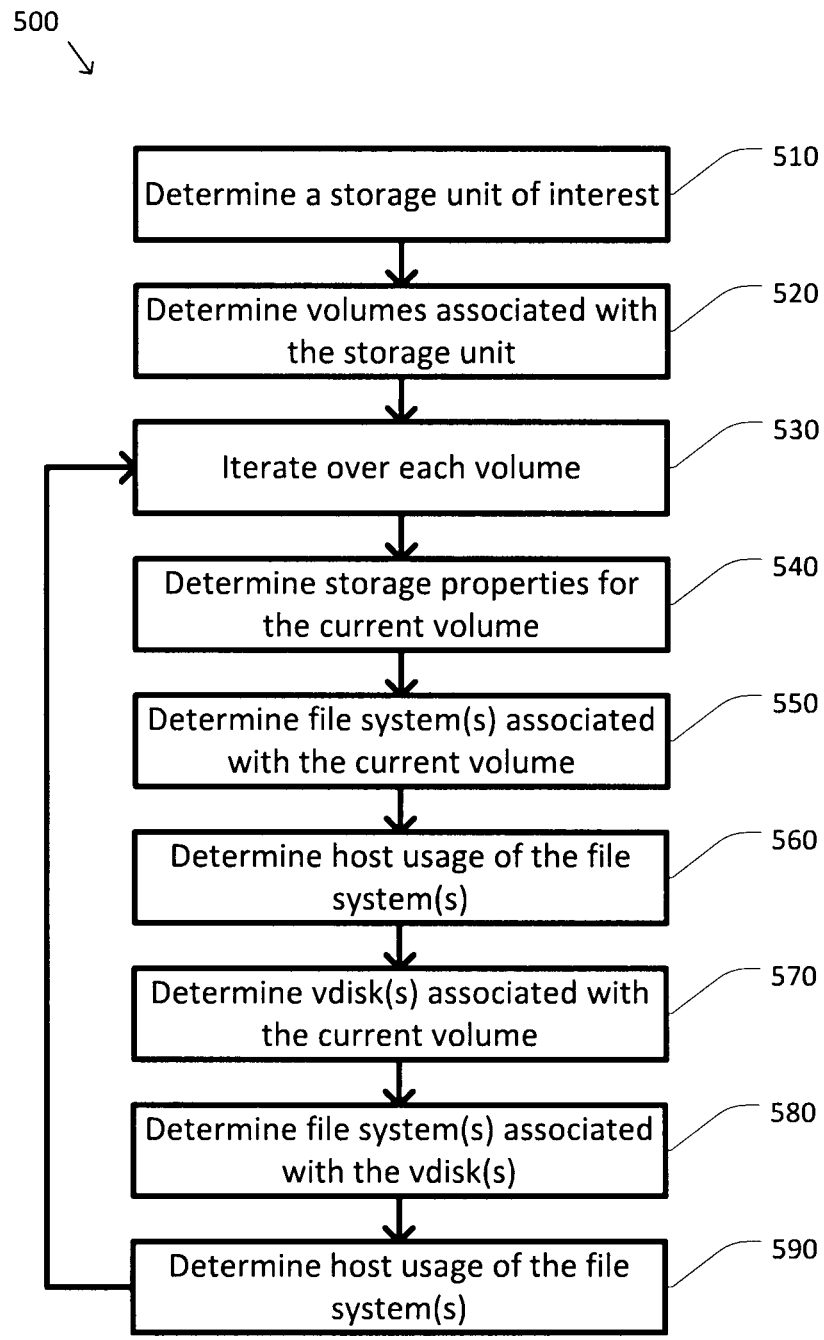
FIG. 5 is a simplified diagram of an example method of storage chargeback in a distributed computing system according to some embodiments.

Once the discovery of method 400 is complete, the data structures and/or databases created during method 400 may be used to support one or more management and/or monitoring use cases. FIG. 5 is a simplified diagram of an example method 500 of storage chargeback in a distributed computing system according to some embodiments. One or more of the processes 500-590 of method 500 may be implemented, at least in part, in the form of executable code stored on non-transient, tangible, machine readable media that when run by one or more processors (e.g., the one or more processors 210) may cause the one or more processors to perform one or more of the processes 500-590. For example, method 500 may be implemented by one or more of the management and monitoring applications 230 of monitoring server 190. In some examples, method 500 may correspond to a portion of the management and/or monitoring phase of the one or more of the management and monitoring applications 230. In some examples, method 500 may be used to examine instances of the various entities of entity relationship 300 and then use them to access the storage and/or compute resource storage datasources associated with them.

At a process 510, a storage unit of interest is determined. In some examples, a user and/or operator of a system may select a storage unit for which chargeback information is desired by specifying an identifier for the storage unit, selecting a storage unit from a list provided to the user in a user interface, clicking on a hyperlink in a web page, and/or the like. In some examples, the storage unit may correspond to one or more storage devices, such as disk drives, flash storage devices, RAID arrays, and/or the like. In some examples, the storage unit may be used to store data for one or more volumes and/or one or more virtual disks. In the examples of FIG. 1, the storage unit may include any of the storage units used to store data for volumes 181-184 and/or virtual disks 126 and/or 127.

At a process 520, one or more volumes associated with the storage unit are determined. Each of the volumes whose data is being stored on the storage unit are determined by examining the one or more data structures and/or databases being used to record the entities and their relationships in the distributed computing system and/or distributed storage system. In some examples, an instance of the storage_unit entity associated with the storage unit identifier and/or selection by the user may be examined to determine the one or more volumes associated with the storage unit. When the data structure or database used to record the storage identifiers is consistent with the entity relationship 300, the instances of volume 335 associated with the storage_unit entity corresponding to the storage unit identifier via instances of the unit_volume associative entity may be determined. In some examples, the instances of volume 335 may be limited to instances of volume 335 that have an associated instance of volume_ID 340, which indicates the instance of the volume is able to support the chargeback use case. In some examples, the one or more volumes associated with the storage unit may be returned in a list, an array, a result set, and/or other iteratable data structure.

At a process 530, each volume in the list, array, result set and/or other iteratable data structure is iterated over. In some examples, the iteration may include the use of a loop index and/or iterator and a loop structure, such as a for loop, while loop, and/or the like. As each volume is iterated over, it becomes the current volume.

At a process 540, storage properties for the current volume are determined. In some examples, the storage properties may be determined by examining the metadata and/or other information recorded in the data structure and/or database storing the instances of the volume. In some examples, the storage datastore associated with the volume may be determined from the data structure and/or database and the storage datastore queried for the storage properties. In some examples, the storage properties may be associated with how much capacity is reserved on the storage unit for the current volume and the level of service provided by the storage unit or the larger distributed storage system for the current volume. In some examples, the level of service may be related to a maximum and/or average latency in response to storage requests made to the current volume, how many peak and/or average storage requests the volume can handle during a given time period, the peak and/or average data rate or bandwidth available to the volume to send and receive data, the amount of backup or redundancy being provided for data stored on the current volume, the storage tier of the current volume, and/or the like. In some examples, the capacity and/or the level of service may indicate cost and/or pricing information for data store on the current volume.

At a process 550, file system(s) associated with the current volume are determined. Depending upon the nature of the current volume, zero, one, or two or more file system(s) may be using the current volume to store data. One or more data structures and/or databases may be examined to determine the file system(s) using the current volume. When the data structure or database used to determine the file system(s) is consistent with the entity relationship 300, instances of fs_volume 330 associated with the instance of volume 335 corresponding to the current volume may be used to determine instance(s) of file_system 325 corresponding to the file system(s) using the current volume.

At a process 560, host usage of the file system(s) is determined. Once each of the file system(s) using the current volume are determined by process 550, the usage of each of the file system(s) by a respective host is determined. A data structure and/or database may be examined to determine a respective host associated with each of the file system(s) using the current volume. When the data structure or database used to determine the file system(s) is consistent with the entity relationship 300, the respective host associated with each of the file system(s) may be determined by finding a corresponding instance of device 310 (for a physical host, such as physical host 110) or a corresponding instance of virtual_machine 315 (for a virtual machine, such as virtual machine 130 and/or 140) associated with the corresponding instance of file_system 325 by an instance of fs_host 320. The corresponding instance of device 310 or virtual_machine 315 is then used to determine the corresponding instance of compute_resource 305. The metadata and/or other information recorded for the instance of compute_resource 305 is then used to determine the respective compute resource datasource(s) for the respective host(s) using each of the file system(s). In the examples of FIG. 1, when the current volume is volume 181, the data structure and/or database may be used to determine that file systems 111 and 112 are using volume 181 and physical host 110 is using file systems 111 and 112.

Once the respective compute resource datasource(s) for the respective host(s) are known, each of the respective compute resource datasources(s) may be queried to determined actual usage data of the current volume by each of the file system(s). In some examples, the respective compute resource datasource(s) for each of the respective hosts may use one or more operating system and/or file system API calls to determine the actual usage of the current volume by the respective file system(s).

At a process 570, virtual disk(s) associated with the current volume are determined. In some examples, the current volume may be providing storage for zero, one, or two or more virtual disk(s). A data structure and/or database may be examined to determine the virtual disk(s) using the current volume. When the data structure or database used to determine the virtual disk(s) is consistent with the entity relationship 300, the instances of vdisk 350 associated with the instance of volume 335 corresponding to the current volume may be determined by the associations created by instance(s) of volume_ID 340, vdisk_volume 360, and vdisk_ID 355.

At a process 580, file system(s) associated with the virtual disk(s) are determined. Depending upon the nature of the virtual disk(s), zero, one, or two or more file system(s) may be using each of the virtual disk(s) to store data. One or more data structures and/or databases may be examined to determine the respective file system(s) using each of the virtual disk(s). When the data structure or database used to determine the file system(s) is consistent with the entity relationship 300, instances of fs_vdisk 340 associated with each instance of vdisk 350 corresponding to each of the virtual disk(s) may be used to determine instance(s) of file_system 325 corresponding to the file system(s) using each of the virtual disk(s).

At a process 590, host usage of the file system(s) is determined. Once each of the file system(s) using each of the virtual disk(s) are determined by process 580, the usage of each of the file system(s) by a respective host is determined. A data structure and/or database may be examined to determine a respective host associated with each of the file system(s) using each of the virtual disk(s). When the data structure or database used to determine the file system(s) is consistent with the entity relationship 300, the respective host associated with each of the file system(s) may be determined by finding a corresponding instance of device 310 (for a physical host, such as physical host 110) or a corresponding instance of virtual_machine 315 (for a virtual machine, such as virtual machine 130 and/or 140) associated with the corresponding instance of file_system 325 by an instance of fs_host 320. The corresponding instance of device 310 or virtual_machine 315 is then used to determine the corresponding instance of compute_resource 305. The metadata and/or other information recorded for the instance of compute_resource 305 is then used to determine the respective compute resource datasource(s) for the respective host(s) using each of the file system(s). In the examples of FIG. 1, when the current volume is volume 183, the data structure and/or database may be used to determine that virtual disks 126 and 127 are using volume 183, file system 132 is using virtual disk 126, file system 141 is using virtual disk 127, virtual machine 130 is using file system 132, and virtual machine 140 is using file system 141.

Once the respective compute resource datasource(s) for the respective host(s) are known, each of the respective compute resource datasources(s) may be queried to determined actual usage data of each of the virtual disk(s) by each of the file system(s). In some examples, the respective compute resource datasource(s) for each of the respective hosts may use one or more operating system and/or file system API calls to determine the actual usage of the current volume by the respective file system(s).

Once the host usage for the current volume is determined using the storage properties determined during process 540 and the host usage of the current volume is determined during process 560 (for the file system(s) using the current volume, if any) and/or process 590 (for the file system(s) using virtual disk(s) using the current volume, if any), the chargeback values for the current volume may be determined. Once the chargeback is determined for the current volume, method 500 returns to process 530 to iterate over the next volume using the storage unit of interest. Once chargeback values for each of the volumes determined during process 520 is complete, chargeback for the storage unit of interest is known and may be displayed and/or provided to a user and/or operator.

The scope of embodiments is not limited to the processes shown in FIG. 5. According to certain embodiments, other arrangements and/or combinations of processes similar to processes 510-590 may be used to support other management and monitoring use cases that use information associated with both storage devices and compute resources.

Some examples of physical host 110, virtual machines 130 and 140, the device running hypervisor 120, storage server 170, monitoring server 190, and/or computing device 200 may include non-transitory, tangible, machine readable media that include executable code that when run by one or more processors may cause the one or more processors (e.g., the one or more processors 210) to perform the processes of methods 400 and/or 500 as described above. Some common forms of machine readable media that may include the processes of methods 400 and/or 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A computing system comprising:
a memory containing machine readable medium comprising machine executable code having stored thereon instructions for performing a method of managing application performance;
a processor coupled to the memory, the processor configured to execute the machine executable code to:
detect a first datasource for a storage device based on a response from the storage device;
determine one or more first storage identifiers associated with the storage device and a storage device type;
record the one or more first storage identifiers and the storage device type to generate a storage entity within an entity hierarchy maintained by the management application, wherein the storage entity varies based on the storage device type;
detect a second datasource for a compute resource based on a response from the compute resource;
determine a type of the compute resource and a file system used by the compute resource to generate a compute entity for the entity hierarchy, wherein the compute entity varies based on compute resource type;
determine a second storage identifier associated with the file system; and
in response to determining that the second storage identifier matches one of the first storage identifiers, record a first association between the file system and the compute resource and record a second association between the file system and the storage device within the entity hierarchy.

2. The computing system of claim 1, wherein the processor determines the one or more storage identifiers by querying the first datasource.

3. The computing system of claim 1, wherein the processor determines the file system and the second storage identifier by querying the second datasource.

4. The computing system of claim 1, wherein each of the first storage identifiers are selected from a group consisting of a serial number, a universally unique identifier, a logical unit number, and a physical device identifier.

5. The computing system of claim 1, wherein one of the first storage identifiers is specific to a use case supported by the storage device.

6. The computing system of claim 1, wherein the second storage identifier is specific to a use case supported by the compute resource.

7. The computing system of claim 1, wherein the storage device is selected from a group consisting of a volume and a virtual disk.

8. The computing system of claim 1, wherein in response to determining that the storage device is a virtual disk, the processor further determines one or more volumes storing data for the virtual disk.

9. The computing system of claim 1, wherein the compute resource is selected from a group consisting of a physical host and a virtual machine.

10. The computing system of claim 1, wherein the processor further:
determines storage properties for the storage device using the first datasource;
determines first actual usage of the storage device by the compute resource using the second datasource; and
determines charges for use of storage device by the compute resource based on the storage properties and the first actual usage.

11. The computing system of claim 10, wherein the processor further:
determines a virtual disk using the storage device;
determines second actual usage of the virtual disk by the compute resource using the second datasource; and
determines additional charges for use of the storage device by the compute resource based on the storage properties and the second actual usage.

12. The computing system of claim 10, wherein the processor further determines the first actual usage of the storage device based on third actual usage of the storage device by the file system.

13. A method comprising:
detecting, by a monitoring application being executed by a processor in a computing system, a first datasource for a storage device based on a response from the storage device;
determining one or more first storage identifiers associated with the storage device and a storage device type;
recording the one or more first storage identifiers and the storage device type to generate a storage entity within an entity hierarchy maintained by the monitoring application, wherein the storage entity varies based on the storage device type;
detecting a second datasource for a compute resource;
determining a type of the compute resource and a file system used by the compute resource to generate a compute entity for the entity hierarchy, wherein the compute entity varies based on compute resource type;
determining a second storage identifier associated with the file system; and
in response to determining that the second storage identifier matches one of the first storage identifiers, recording a first association between the file system and the compute resource and recording a second association between the file system and the storage device within the entity hierarchy.

14. The method of claim 13, wherein:
determining the one or more storage identifiers comprises querying the first datasource; and determining the file system and the second storage identifier comprises querying the second datasource.

15. The method of claim 13, wherein one of the first storage identifiers is specific to a use case supported by the storage device.

16. The method of claim 13, wherein the second storage identifier is specific to a use case supported by the compute resource.

17. The method of claim 13, further comprising:
   determining storage properties for the storage device using the first datasource;
   determining first actual usage of the storage device by the compute resource using the second datasource; and
   determining charges for use of the storage device by the compute resource based on the storage properties and the first actual usage.

18. The method of claim 17, wherein determining the first actual usage of the storage device comprises determining third actual usage of the storage device by the file system.

19. A non-transitory machine-readable medium having stored thereon instructions for performing a method of monitoring a computing system, comprising machine executable code which when executed by at least one machine, causes the machine to:
   detect a storage datasource for a storage device based on a response from the storage device;
   query the storage datasource to determine one or more storage device identifiers associated with the storage device and a storage device type;
   record the one or more storage device identifiers and the storage device type to generate a storage entity within an entity hierarchy maintained by a management application, wherein the storage entity varies based on the storage device type;
   detect a host datasource for a host;
   query the host data source to determine a type of a compute resource and a file system used by host to generate a compute entity for the entity hierarchy, wherein the compute entity varies based on compute resource type;
   query the host data source to determine a candidate identifier associated with the file system; and
   in response to determining that the candidate identifier matches one of the storage device identifiers, record a first association between the file system and the host and record a second association between the file system and the storage device.

20. The non-transitory machine-readable medium of claim 19, wherein the machine executable code which when executed by the machine, causes the machine to further:
   query the storage datasource to determine storage properties for the storage device;
   query the host datasource to determine actual usage of the storage device by the host; and
   determine charges for use of the storage device by the host based on the storage properties and the actual usage.

* * * * *